United States Patent
Sai

(10) Patent No.: US 10,455,478 B2
(45) Date of Patent: Oct. 22, 2019

(54) VEHICLE-MOUNTED MILLIMETER-WAVE COMMUNICATION DEVICE AND COMMUNICATION METHOD

(71) Applicant: TOYOTA JIDOSHA KABUSHIKI KAISHA, Toyota-shi, Aichi-ken (JP)

(72) Inventor: Seii Sai, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 15/933,816

(22) Filed: Mar. 23, 2018

(65) Prior Publication Data
US 2018/0288672 A1    Oct. 4, 2018

(30) Foreign Application Priority Data

Mar. 30, 2017    (JP) .................................. 2017-067770

(51) Int. Cl.
*H04W 40/22*    (2009.01)
*H04W 4/46*    (2018.01)
*H04W 4/40*    (2018.01)

(52) U.S. Cl.
CPC ............. *H04W 40/22* (2013.01); *H04W 4/40* (2018.02); *H04W 4/46* (2018.02)

(58) Field of Classification Search
None
See application file for complete search history.

(56) References Cited

U.S. PATENT DOCUMENTS

| 7,254,480 B2* | 8/2007 | Watanabe | G01C 21/26 455/500 |
| 9,114,707 B2* | 8/2015 | Shida | B60W 30/16 |
| 2005/0222948 A1 | 10/2005 | Sato et al. | |
| 2011/0205969 A1 | 8/2011 | Ahmad et al. | |
| 2015/0163852 A1* | 6/2015 | Kwon | H04B 7/022 370/315 |
| 2016/0277911 A1 | 9/2016 | Kang et al. | |

(Continued)

FOREIGN PATENT DOCUMENTS

| JP | 2001-184594 A | 7/2001 |
| JP | 2003-060643 A | 2/2003 |
| JP | 2006-166321 A | 6/2006 |

(Continued)

*Primary Examiner* — Hong S Cho
(74) *Attorney, Agent, or Firm* — Oliff PLC

(57) ABSTRACT

A vehicle-mounted millimeter-wave communication device includes: an acquisition unit for acquiring a relay request that requests relay of communication from a first communication partner, a detection unit for detecting directions of the first communication partner and a second communication partner that are viewed from the vehicle, and a communication control unit for performing control such that, in the case where the relay request is received from the first communication partner and it is possible to communicate with the second communication partner, communication, in which a communication time longer than a communication time set for another direction is set for each of the directions of the first communication partner and the second communication partner, is performed, and communication between the first communication partner and the second communication partner is relayed.

13 Claims, 7 Drawing Sheets

(56) References Cited

U.S. PATENT DOCUMENTS

2017/0149130 A1   5/2017   Kim

FOREIGN PATENT DOCUMENTS

| JP | 2007-527125 A | 9/2007 |
| JP | 2007-312280 A | 11/2007 |
| KR | 10-1709076 B1 | 2/2017 |
| WO | 2003/032617 A1 | 4/2003 |
| WO | 2006/021235 A1 | 3/2006 |

* cited by examiner

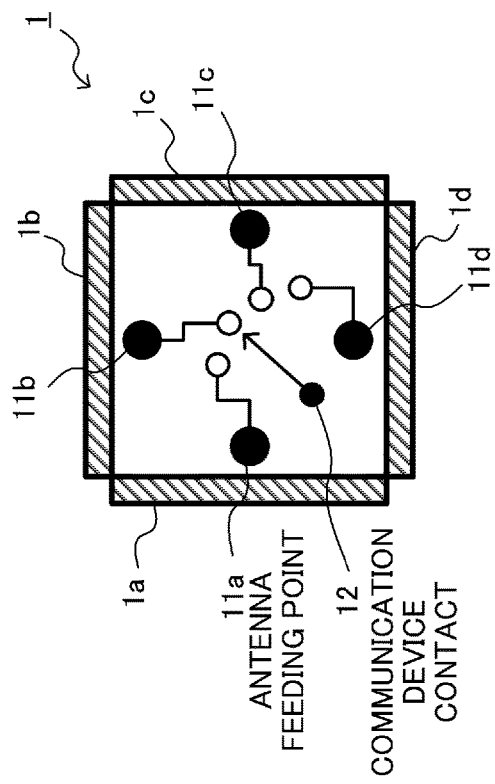
FIG. 2B  CONFIGURATION DIAGRAM
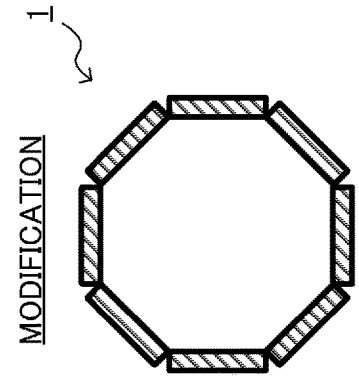
FIG. 2C  MODIFICATION
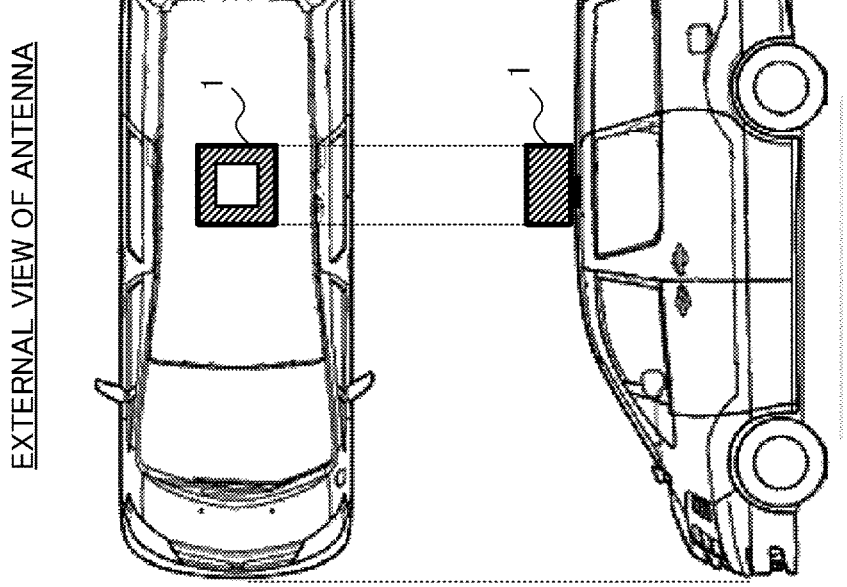
FIG. 2A  EXTERNAL VIEW OF ANTENNA

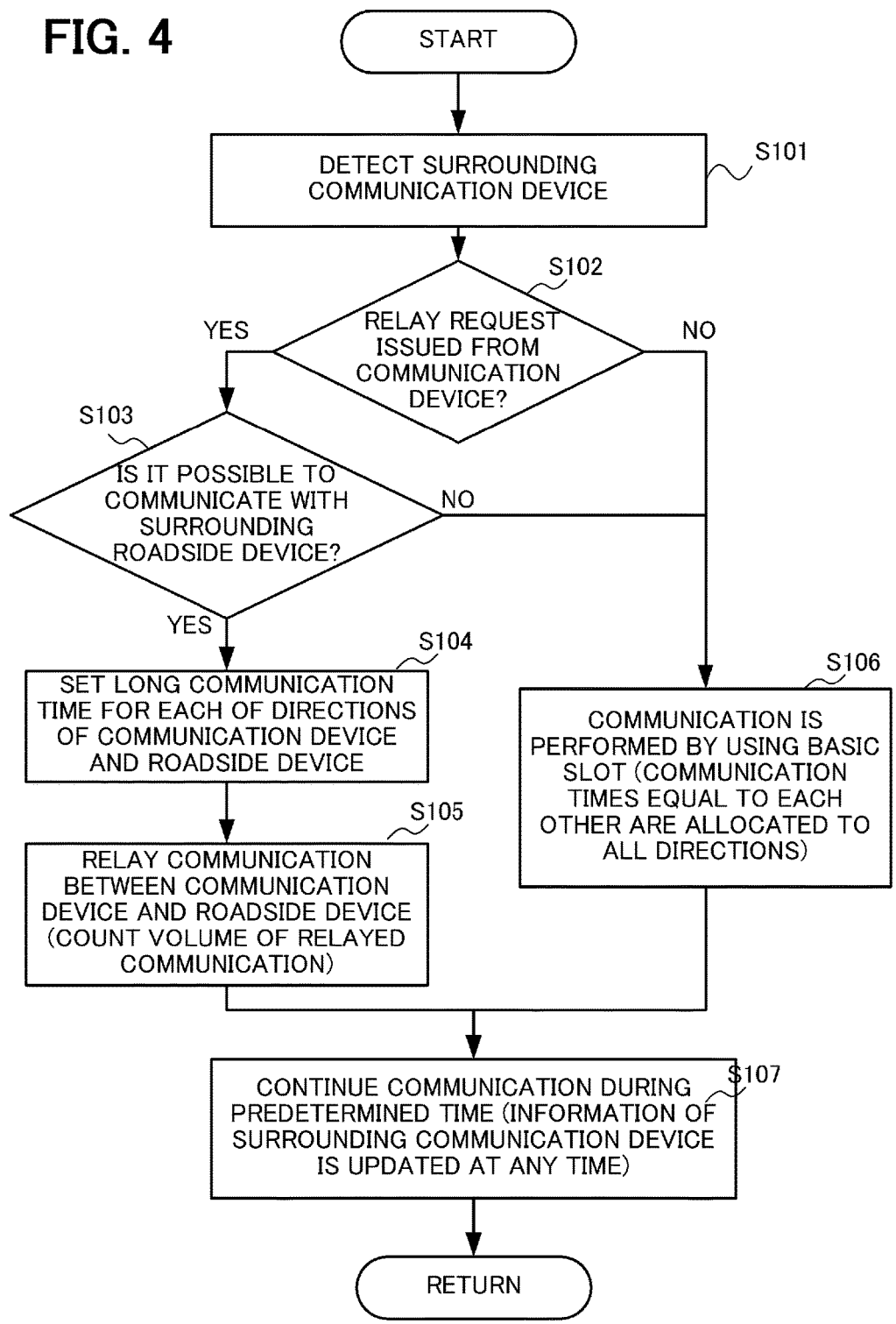

LONG COMMUNICATION TIMES ARE ALLOCATED TO BACKWARD AND RIGHT DIRECTIONS

VEHICLE-MOUNTED MILLIMETER-WAVE COMMUNICATION DEVICE AND COMMUNICATION METHOD

BACKGROUND OF THE INVENTION

Field of the Invention

The present invention relates to millimeter wave communication, and more particularly relates to communication control that enables efficient relay of millimeter wave communication in road-to-vehicle and vehicle-to-vehicle communication.

Description of the Related Art

The use of millimeter waves (a band from 24 GHz to 86 GHz) is proposed to implement high-capacity communication in the next generation mobile communication system (5G). The millimeter wave has high straightness, and hence it is necessary to appropriately adjust a communication direction (directivity) to perform communication.

Japanese Patent Application Publication No. 2003-60643 discloses that a wireless relay device relays communication between a mobile phone terminal and a fixed wireless communication terminal. Specifically, in the case where the wireless relay device in Japanese Patent Application Publication No. 2003-60643 has received data from a wireless communication device, the wireless relay device contacts surrounding wireless communication devices to produce the list of wireless communication devices that can perform communication, and transmits the data to another wireless communication device selected from the list. The wireless relay device also manages subsequent transmission and reception of data by the wireless communication devices included in the list. It is possible to perform transmission and reception between the mobile phone terminal and the fixed wireless communication terminal via the wireless relay device.

In the case where a vehicle-mounted communication device relays communication between two wireless communication devices in millimeter wave communication, it is probable that radio waves do not reach the wireless communication device reliably due to high straightness of millimeter waves.

SUMMARY OF THE INVENTION

An object of the present invention is to use a vehicle-mounted communication device as a relay device of millimeter wave communication to perform relay of communication more reliably than conventionally performed.

A first aspect of the present invention is a vehicle-mounted millimeter-wave communication device mounted on a vehicle and performing communication while temporally changing a communication direction by using an antenna unit capable of changing directivity including an acquisition unit configured to acquire a relay request that requests relay of communication from a first communication partner, a detection unit configured to detect directions of the first communication partner and a second communication partner that are viewed from the vehicle, and a communication control unit configured to perform control such that, in a case where the relay request is received from the first communication partner and it is possible to communicate with the second communication partner, communication, in which a communication time longer than a communication time set for another direction is set for each of the directions of the first communication partner and the second communication partner, is performed, and communication between the first communication partner and the second communication partner is relayed.

Thus, by performing the communication in which the communication time longer than the communication time set for another direction is set for each of the directions of the first communication partner and the second communication partner, the relay process between the first communication partner and the second communication partner is performed more reliably.

Each of the first and second communication partners (wireless communication devices) may be any wireless communication device that uses millimeter waves, and it is possible to use, e.g., a mobile communication device such as a mobile phone terminal or a smart phone terminal, and a fixed communication device that is fixed on the roadside (roadside device) as the first communication partner and the second communication partner.

The communication control unit in the present aspect may perform control such that, in the case where the relay request is received from the first communication partner and it is possible to communicate with the second communication partner, communication, in which a long communication time is set for each of the directions of the first communication partner and the second communication partner, and communication, in which communication times that are equal to each other are set for all directions, are performed alternately. The communication control unit may use the two types of the communication modes at an equal time ratio or may use one of the communication modes at a higher ratio.

According to this configuration, it is possible to allocate many communication resources to the first and second communication partners to perform communication having a larger communication volume in a short time, and keep communication with the communication partners present in the other directions.

As an antenna unit in the present aspect, it is possible to use, e.g., a plurality of fixed antennas directed in different directions. Although the directivity of each fixed antenna cannot be adjusted, the communication control unit can adjust the directivity by selecting the antenna to be used, and can change the setting of the communication time of each direction by adjusting a time period of selecting each of fixed antennas.

As another example of the antenna unit in the present aspect, it is possible to use a rotary antenna. The communication control unit can adjust the directivity by rotating the antenna, and can change the setting of the communication time of each direction by adjusting a rotation speed at each angle (orientation).

As still another example of the antenna unit in the present aspect, it is also possible to use an array antenna having multiple elements. The communication control unit can adjust the directivity by beamforming, and can change the setting of the communication time of each direction by adjusting the directivity and the direction of the directivity.

The detection unit in the present aspect can detect the direction of a communication partner based on a communication direction when communication by millimeter wave communication is established. The millimeter wave communication has high straightness, and hence it can be determined that the communication direction when the communication is established is the direction in which the communication partner is present.

In addition, the detection unit in the present aspect may detect the direction of the communication partner based on position information on the communication partner received through communication. In the case where the position information is transmitted from the communication partner, the detection unit can determine the direction of the communication partner from the received position information and position information on the vehicle. The communication through which the position information is transmitted may be the millimeter wave communication or communication other than the millimeter wave communication. Examples of the communication other than the millimeter wave communication include 3G or 4G mobile telephone communication, a wireless LAN (IEEE 802.11a/b/g/n), DSRC, WAVE (IEEE 802.11p), and 700 MHz band intelligent transport systems (ARIB STD-T109).

Further, the detection unit in the present aspect may detect the direction of the communication partner based on sensor information obtained from a sensor mounted on the vehicle. An example of the sensor includes a camera, and the direction of the communication partner (e.g., a vehicle or a roadside communication device) is determined by detecting the communication partner by image processing. In addition, as the sensor, for example, a radar and a laser sensor may also be used.

In the case where the communication partner is a roadside communication device (fixed communication device), the detection unit may detect the direction of the communication partner based on pre-stored installation information including an installation position and a communication direction of a roadside communication device. Herein, the "pre-stored" means "stored prior to detection of the communication". The installation information may be acquired via, e.g., communication or a recording medium before the running of the vehicle is started and stored in the vehicle-mounted millimeter-wave communication device, or may also be acquired via communication (not limited to the millimeter wave communication) during running of the vehicle and stored in the vehicle-mounted millimeter-wave communication device.

Note that the present invention can be viewed as a vehicle-mounted millimeter-wave communication device that includes at least part of the above units. The present invention can also be viewed as a radio communication method that executes at least part of the above processes. In addition, the present invention can also be viewed as a computer program for causing a computer to execute the method, or a computer-readable storage medium in which the computer program is stored non-transitorily. The above-described units and processes can be adopted in combination, where feasible, to constitute the present invention.

According to the present invention, a vehicle-mounted communication device functions as a relay device of the millimeter wave communication, and it is possible to perform the relay of the communication more reliably than conventionally performed.

BRIEF DESCRIPTION OF THE DRAWINGS

FIGS. 2A to 2C are views for explaining the configuration of an antenna in the embodiment;

FIG. 4 is a flowchart showing procedures of a communication control process in the embodiment;

DESCRIPTION OF THE EMBODIMENTS

First Embodiment

The present embodiment relates to a vehicle-mounted millimeter-wave communication device that performs communication by using millimeter waves. The vehicle-mounted millimeter-wave communication device is mounted on a vehicle. In the present specification, the vehicle on which the vehicle-mounted millimeter-wave communication device is mounted is referred to as a host vehicle. In the present specification, the "millimeter waves" mean radio waves in a band from 24 GHz to 86 GHz. The millimeter wave has high straightness, and hence it is necessary to appropriately control a communication direction. In particular, a positional relationship with a communication partner frequently changes in a vehicle environment, and the present embodiment uses a communication device and a communication method suitable particularly for such a vehicle environment. The vehicle-mounted millimeter-wave communication device in the present embodiment is configured to function as a relay device that performs relay of communication between a mobile phone base station (fixed base station) and a mobile phone terminal (mobile communication device).

Configuration

Figure 1:
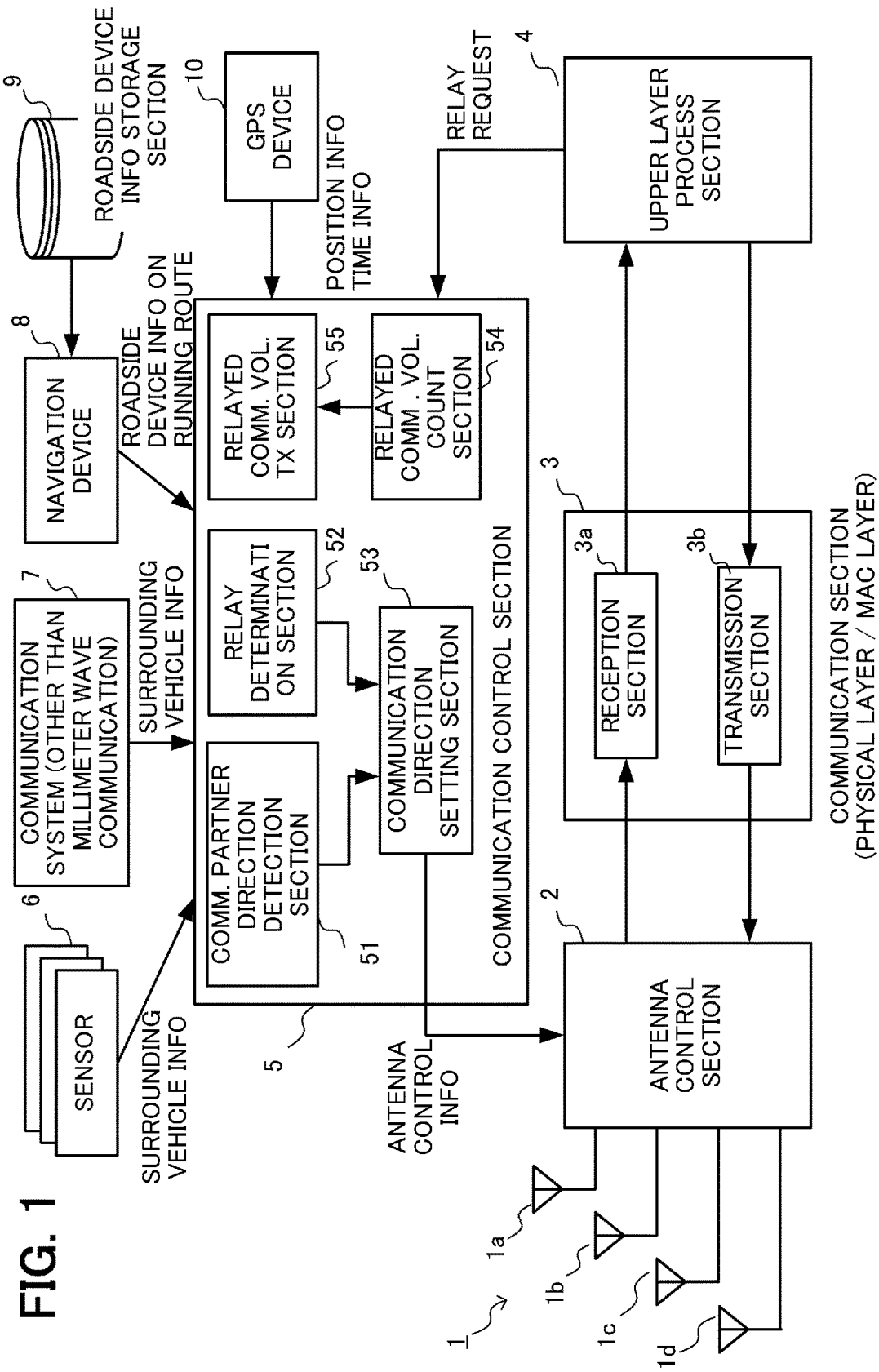
FIG. 1 is a block diagram showing the configuration of a vehicle-mounted millimeter-wave communication device according to an embodiment.

FIG. 1 is a view showing the configuration of the vehicle-mounted millimeter-wave communication device of the present embodiment. As shown in FIG. 1, the vehicle-mounted millimeter-wave communication device according to the present embodiment includes an antenna unit 1, an antenna control section 2, a communication section 3, an upper layer process section 4, and a communication control section 5. The communication control section 5 is configured to be capable of acquiring information from various sensors 6, a communication system 7 for communication other than millimeter wave communication, a navigation device 8, and a GPS device 10 in addition to the upper layer process section 4.

In the present embodiment, the antenna unit 1 includes four fixed patch antennas 1a to 1d. Although the directivity of each patch antenna is fixed, the communication direction (directivity) of the entire antenna unit can be changed by switching of the patch antennas to be used. The vehicle-mounted millimeter-wave communication device performs communication while changing the communication direction based on time-sharing by temporally changing the antenna to be used using the antenna control section 2.

As shown in FIG. 2A, the antenna unit 1 is installed on a roof of a vehicle, and the four patch antennas 1a to 1d are installed to be directed in forward, backward, left, and right directions. Each of the patch antennas 1a to 1d covers an angle range of 90 degrees.

FIG. 2B shows the configuration of the antenna unit 1 more specifically. The patch antennas 1a to 1d have antenna feeding points 11a to 11d respectively, and the antenna control section 2 can control the selection of the antenna to be turned ON by switching the selection of the antenna feeding point 11 connected to a contact 12 of the communication device. Although the directivity of each patch antenna is fixed, it is possible to change allocation of a communication time of each communication direction by adjusting a selection time period of each patch antenna in the switching control by the antenna control section 2. The switching control of the antenna may be performed using a physical switch, or may also be performed using an electronic switch (an electric or electronic circuit).

While an example in which the four patch antennas are used has been described in each of FIGS. 2A and 2B, eight patch antennas may also be used such that each patch antenna covers an angle range of 45 degrees, as shown in FIG. 2C. In addition, the same effect can be obtained by installing the patch antennas 1a to 1d at the front, rear, left, and right of the vehicle instead of installing them on the roof, as shown in FIGS. 3A and 3B.

Figure 3C:
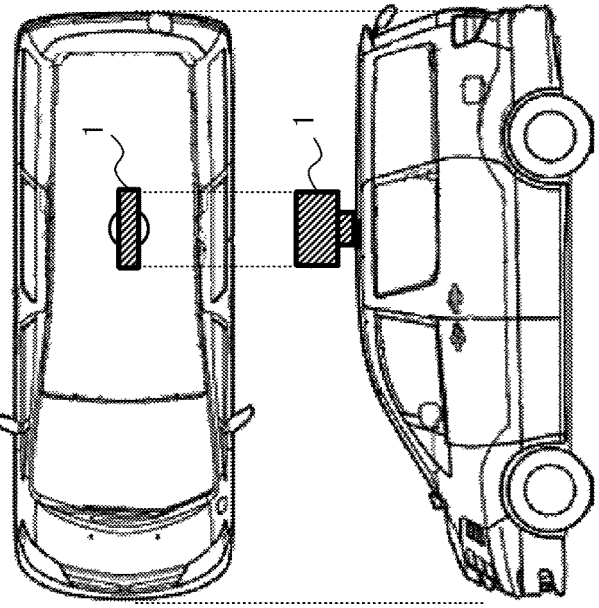
FIGS. 3A to 3D are views for explaining modifications of the configuration of the antenna.
Figure 3D:
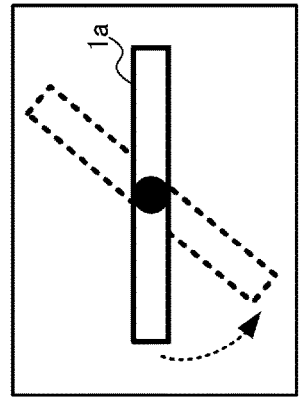
Figure 3A:
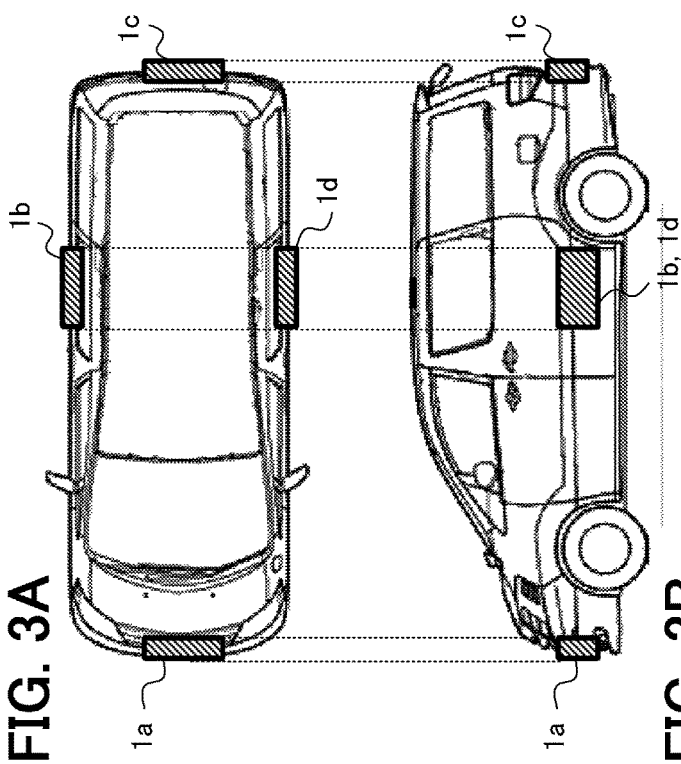
Figure 3B:
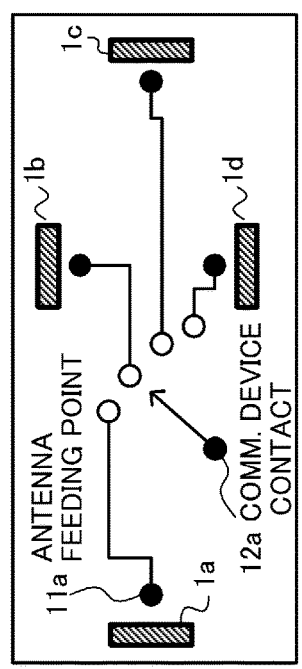

Further, as shown in FIGS. 3C and 3D, communication in each direction may be implemented by installing a rotary antenna on the roof of the vehicle and physically rotating the patch antenna on a horizontal plane in accordance with instructions from the antenna control section 2. The number of directions in which the communication can be performed during any time period is one, but the communication time of each direction can be adjusted by controlling a rotation speed. Furthermore, by making the rotation speed in a specific direction lower than in other directions, it is possible to increase the communication time of the specific direction.

Additionally, the communication direction may be changed temporally by using an adaptive antenna having beamforming capability as the antenna unit 1 and adjusting the directivity thereof.

The communication section 3 performs, among processes related to the communication, processes related to the physical layer and the MAC layer. The communication section 3 includes a reception section 3a and a transmission section 3b. The reception section 3a performs a received radio wave process (down-conversion, analog/digital (A/D) conversion, or the like) and demodulation on a radio signal received in a reception band via the antenna unit 1, and outputs the obtained signal to the upper layer process section 4. The transmission section 3b performs modulation and a transmitted radio wave process (up-conversion, digital/analog (D/A) conversion, or the like) on a signal generated by the upper layer process section 4, and transmits the signal via the antenna unit 1. The communication section 3 performs transmission and reception during a time slot determined by the communication control section 5. In the present embodiment, time synchronization is basically performed based on GPS time (absolute time) obtained from the GPS device 10.

The upper layer process section 4 performs protocol processes at layers above the MAC layer. Consequently, the upper layer process section 4 can determine a communication content type (e.g., communication related to vehicle control, communication related to entertainment, or communication related to road safety) of each communication partner based on received data received from the communication partner.

In addition, based on the received data received from the communication partner, the upper layer process section 4 transmits a large-volume communication request for notifying the communication partner that it is necessary to perform large-volume communication to the communication partner, or acquires the large-volume communication request from the communication partner. The reference of the large-volume communication may be determined according to whether or not a communication volume is not less than a predetermined threshold value. The threshold value of the communication volume may be determined appropriately, and it is preferable to set the threshold value to the communication volume that is considered to require allocation of a long communication time to complete the communication.

Further, the upper layer process section 4 may notify the communication partner of position information of the host vehicle, or acquire the position information from the communication partner. Furthermore, the upper layer process section 4 can recognize the direction of the communication partner that is viewed from the host vehicle based on the communication direction when the millimeter wave communication is established.

The communication control section 5 controls overall processes related to the millimeter wave communication. Herein, among functions controlled by the communication control section 5, the allocation (setting) of the communication time to each communication direction and the relay of the communication will be mainly described. The communication control section 5 includes sub-functional sections of a communication partner direction detection section 51, a relay determination section 52, a communication direction setting section 53, a relayed communication volume count section 54, and a relayed communication volume transmission section 55. The communication partner direction detection section 51, the relay determination section 52, and the communication direction setting section 53 are the sub-functional sections related to setting of the communication time and communication relay control, and the relayed communication volume count section 54 and the relayed communication volume transmission section 55 are the sub-functional sections for counting the volume of relayed communication and reporting the volume of relayed communication to a server device.

The communication partner direction detection section 51 (hereinafter referred to as a direction detection section 51) detects the direction of the communication partner (millimeter-wave communication device) present around the host vehicle that is viewed from the host vehicle. The direction detection section 51 detects the direction of the communication partner based on surrounding vehicle information and roadside device installation information obtained from the communication section 3, the upper layer process section 4, the sensors 6, the communication system 7, and the navigation device 8.

For example, the direction detection section 51 can acquire the position information transmitted from the communication partner through the millimeter wave communication from the upper layer process section 4, acquire the position information of the host vehicle from the GPS device 10, and detect the direction of the communication partner from the position information of the communication partner and the position information of the host vehicle. Alternatively, the direction detection section 51 can detect that the communication partner is present in the communication direction of the antenna selected when the millimeter wave communication is established based on the notification from the communication section 3 or the upper layer process section 4. Alternatively, the direction detection section 51 may detect the direction of the communication partner based on sensor information obtained from the sensors 6. Examples of the sensors 6 include a camera, a radar, and a laser mounted on the vehicle. The direction detection section 51 detects the surrounding vehicle or roadside communication device (roadside device) by performing image recognition processing on an image taken by the camera, and determines that the direction thereof is the direction of the communication partner. Additionally, the direction detection section 51 may also detect the communication partner using the radar or a laser sensor.

In addition, the direction detection section 51 may detect the direction of the communication partner based on information obtained from the communication system 7 for communication other than the millimeter wave communication. The communication system 7 is a communication system that uses, e.g., a wireless LAN (IEEE 802.11a/b/g/n), DSRC, WAVE (IEEE 802.11p), and 700 MHz band intelligent transport systems (ARIB STD-T109). In the case where the position information of the communication partner is obtained from the communication system 7, the direction detection section 51 detects the direction of the communication partner based on these pieces of information, and the position information and running direction of the host vehicle obtained from the GPS device 10.

Further, the direction detection section 51 detects the direction of the communication partner (the roadside device in this case) based on the roadside device installation information on a running route obtained from the navigation device 8. The navigation device 8 can recognize the running route of the host vehicle, and hence the navigation device 8 accesses a roadside device installation information storage section 9 to acquire the installation position and the communication direction of the roadside device installed on the running route of the host vehicle. It is possible to determine the direction of the roadside device based on these pieces of information. Furthermore, it is also possible to predict the direction of the roadside device at some point in the future based on the predicted position of the host vehicle at some point in the future.

The relay determination section 52 determines whether or not the vehicle-mounted millimeter-wave communication device needs to perform the relay of the communication. Specifically, in the case where the relay request is received from the surrounding mobile communication device and it is possible to communicate with the fixed base station, the relay determination section 52 determines that it is necessary to perform the relay of the communication. The relay determination section 52 notifies the communication direction setting section 53 of the determination result.

The communication direction setting section 53 is a functional section that determines the setting of the communication direction of the host vehicle. In the present embodiment, in the case where the communication direction setting section 53 is notified that it is necessary to perform the relay of the communication by the relay determination section 52, the communication direction setting section 53 performs control such that a long communication time is set for each of directions in which a fixed communication device and the mobile communication device are present, and communication between the fixed communication device and the mobile communication device is relayed. On the other hand, in the case where the communication direction setting section 53 is not notified that it is necessary to perform the relay of the communication by the relay determination section 52, the communication direction setting section 53 performs control such that communication times that are equal to each other are set for all directions and communication is performed. A more specific determination method will be described later with reference to a flowchart. The communication direction setting section 53 determines the temporal allocation of the communication direction, and outputs the determined temporal allocation thereof to the antenna control section 2 as antenna control information. The antenna control section 2 controls the antenna unit 1 according to the antenna control information to thereby switch the communication direction of each time. The communication partner is also determined by the determination of the communication direction. Consequently, the communication direction setting section 53 supplies information related to the communication partner of each time (each time slot) to the transmission section 3b such that the transmission section 3b can select the time slot and the communication partner to which the information is to be transmitted during the time slot.

The relayed communication volume count section 54 is a functional section that counts and stores the communication volume when the communication between the fixed communication device and the mobile communication device is relayed. In the present embodiment, the communication volume is counted based on information obtained from the upper layer process section 4, and hence it is possible to count the communication volume of each communication content. The communication content type is freely classified, and examples of the communication content type include communication related to vehicle control or road safety, communication related to entertainment information, and communication related to specific information (chargeable information and the like). The relayed communication volume count section 54 may store, in association with the volume of the relayed communication, identifiers of the fixed base station and the mobile communication device serving as relay targets, and a position, time, and a road environment when the relay is performed.

The relayed communication volume transmission section 55 transmits information related to the volume of the relayed communication counted and stored by the relayed communication volume count section 54 to the server device when it becomes possible to communicate with the server device. This communication is not limited to the millimeter wave communication, and may be performed by another wireless communication such as cellular communication or WiFi.

Each functional section described above may be implemented by an electric or electronic circuit, or may also be implemented by execution of a program stored in a storage device by a central processing unit (CPU), a digital signal processor (DSP), or a field programmable gate array (FPGA). That is, the vehicle-mounted millimeter-wave communication device according to the present embodiment may be implemented by a combination of a computer and software, may be implemented by a hardware circuit, or may also be implemented by a combination thereof.

The sensors 6, the communication system 7, and the navigation device 8 are described above, and hence the repeated description thereof will be omitted.

The roadside device installation information storage section 9 stores the installation positions and the communication directions of the roadside device and mobile phone base stations. (collectively referred to as roadside device installation information). The roadside device installation information may be acquired by any method. For example, the roadside device installation information can be acquired via a storage medium or radio communication, and stored in the storage section 9. In particular, the roadside device installation information may be acquired by using the millimeter wave communication or other communication systems during running of the vehicle.

The GPS device 10 is used to acquire the position information on the vehicle and the current time. Note that it is possible to use any position information acquisition device and any time information acquisition device other than the GPS device as long as the devices can acquire the same information. For example, as the position information acquisition device, a positioning device that uses a satellite positioning system other than GPS (a global navigation satellite system such as Galileo, GLONASS, or Compass, or a regional navigation satellite system such as BDS or DORIS), or a base station positioning device may be used.

Process

FIG. 4 is a flowchart showing a communication control process in the present embodiment. The process shown in FIG. 4 is repeatedly executed every predetermined time (e.g., 1 second, 3 seconds, or 5 seconds).

In Step S101, the communication control section 5 acquires information related to a surrounding communication device (e.g., the mobile phone terminal, the vehicle, or the roadside device), and the direction detection section 51 detects the direction of the communication partner (in the case where the communication partner is present).

In Step S102, the relay determination section 52 determines whether or not the relay request is received from the surrounding communication device. In the case where the relay request is received from the surrounding communication device (S102-YES), the process proceeds to Step S102, and the relay determination section 52 determines whether or not it is possible to communicate with the surrounding roadside device. In the case where the determinations in Steps S102 and S103 are affirmative (S102-YES and S103-YES), the process proceeds to Step S104, and the relay of the communication between the communication device and the roadside device is performed. On the other hand, in the case where one of the determinations in Steps S102 and S103 is negative (S102-NO or S103-NO), the process proceeds to Step S106, and the communication times that are equal to each other are allocated to all direction and the communication is performed.

In Step S104, the communication direction setting section 53 acquires the directions of the communication device and the roadside device that are viewed from the host vehicle from the direction detection section 51, and sets the long communication time for each of the directions in which these devices are present. In Step S105, the communication control section 5 performs control such that the communication between the communication device and the roadside device is relayed. During the control, the relayed communication volume count section 54 counts and stores the volume of the relayed communication between the communication device and the roadside device.

In Step S106, the communication direction setting section 53 allocates the communication times that are equal to each other to all direction, and the communication is performed.

In Step S107, the communication is performed during a predetermined time by using the communication time allocation set in Step S104 or S106. When the predetermined time elapses, the procedures from Step S101 are repeatedly executed. Note that the position of the host vehicle and information of the surrounding communication device are updated at any time during the execution of the communication based on the set communication time allocation.

Operation Example

The communication time allocation in each of Steps S104 and S106 will be described in greater detail based on specific operation examples shown in FIGS. 5 to 7.

Figure 5:
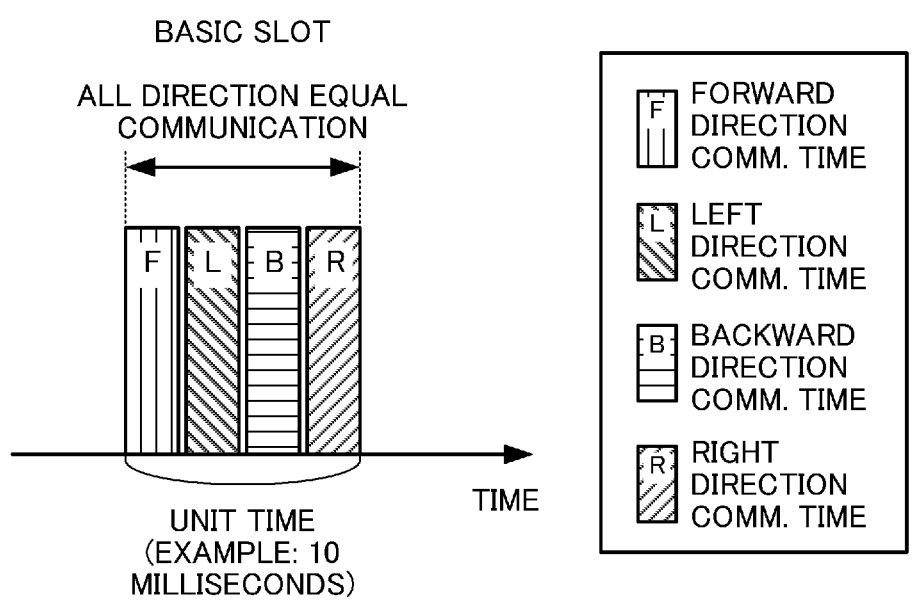
FIG. 5 is a view for explaining an example of communication time allocation in the embodiment.

FIG. 5 is a view for explaining the case where the communication times that are equal to each other are allocated to all communication directions (the procedure in Step S106). Herein, a description will be made by using 10 milliseconds as one unit time (communication cycle). In the case where the communication times that are equal to each other are allocated to all directions, 10 milliseconds serving as the unit time is quartered, and 2.5 milliseconds is allocated to each of forward, backward, left, and right directions as the communication time. By using this basic slot repeatedly, it is possible to obtain communication opportunities equally with communication partners in all directions.

Figure 6A:
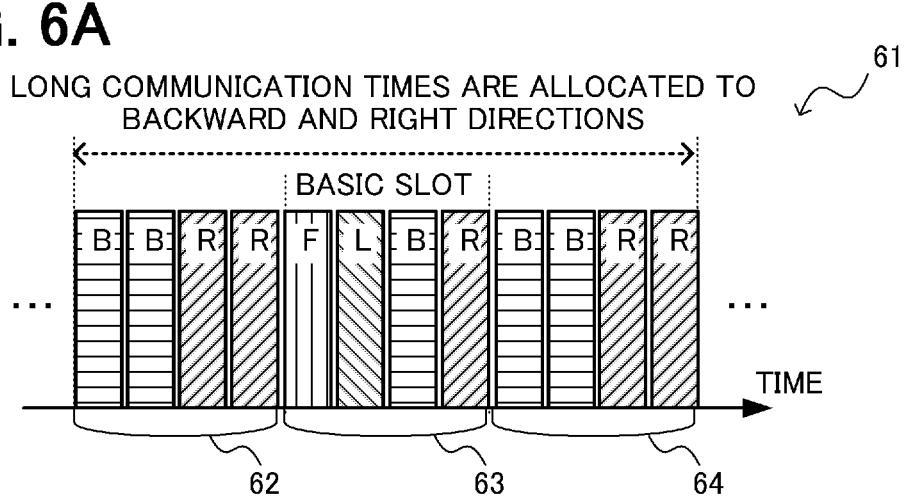
FIGS. 6A and 6B are views for explaining an example of the communication time allocation in the embodiment.
Figure 6B:
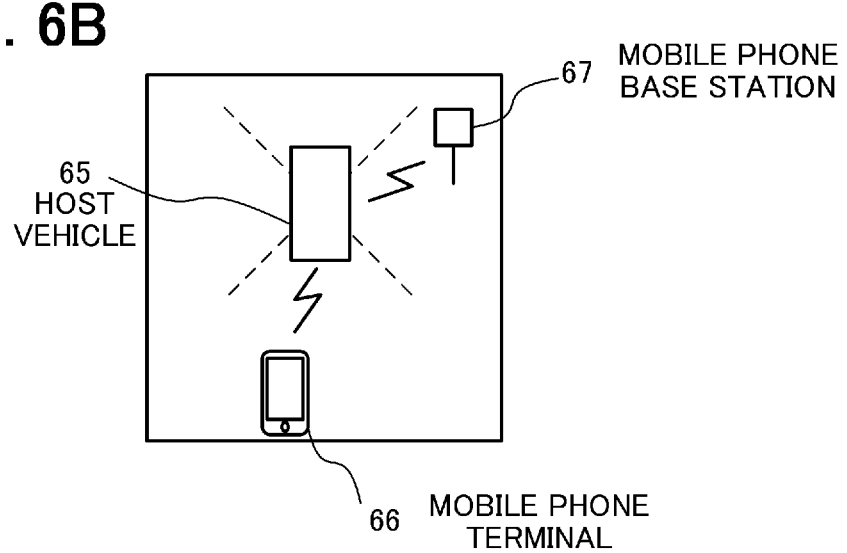

FIGS. 6A and 6B are views for explaining the case where the long communication time is allocated to the direction in which the communication partner is present (the procedure in Step S105). FIG. 6A is a view showing the allocation of the communication time in the case where a mobile phone terminal 66 is positioned in the backward direction of a host vehicle 65, a mobile phone base station 67 is present in the right direction of the host vehicle 65, and the relay request is received from the mobile phone terminal 66, as shown in FIG. 6B. Herein, an allocation time period 61 consisting of three unit time periods 62, 63, and 62 is used as one unit, and the communication is performed by repeating the unit. In this case, since the communication partners are present in the backward and right directions of the host vehicle, the communication direction setting section 53 sets the communication times only for the backward and right directions during the time period 62. Specifically, 5 milliseconds is allocated to the communication in each of the backward and right directions equally. During the time period 63, the communication times that are equal to each other are allocated to all directions. As a whole, in the case where the communication partner is present around the host vehicle, the communication is controlled such the time period 62 during which the long communication time is set for the direction of the communication partner and the communication is performed, and the time period 63 during which the communication times that are equal to each other are set for all directions and the communication is performed are alternately set.

Thus, in the present embodiment, the time period 62 during which the communication time is allocated only to the direction in which the communication partner is present, and the time period 63 during which the communication times that are equal to each other are allocated to all directions are alternately combined. With this, as a whole, it is possible to allocate the communication time longer than those allocated to the other directions to the direction in which the communication partner is present. It is possible to perform the relay of the communication more reliably at high throughput by allocating the long communication time to the direction in which the communication partner that needs the relay is present, and it is also possible to keep the communication with the other communication partners (a communication partner that does not need the relay and a new communication partner) by allocating the communication times to the other directions.

A time ratio between the time period during which the communication time is allocated to the direction in which the communication partner that needs the relay is present and the time period during which the communication times that are equal to each other are allocated to all directions is 2 to 1 in the above example, but any ratio other than the above ratio may be set. The time periods may be set to be equal to each other, and the time period of the equal allocation may be set to be longer than the other time period.

Figure 7:
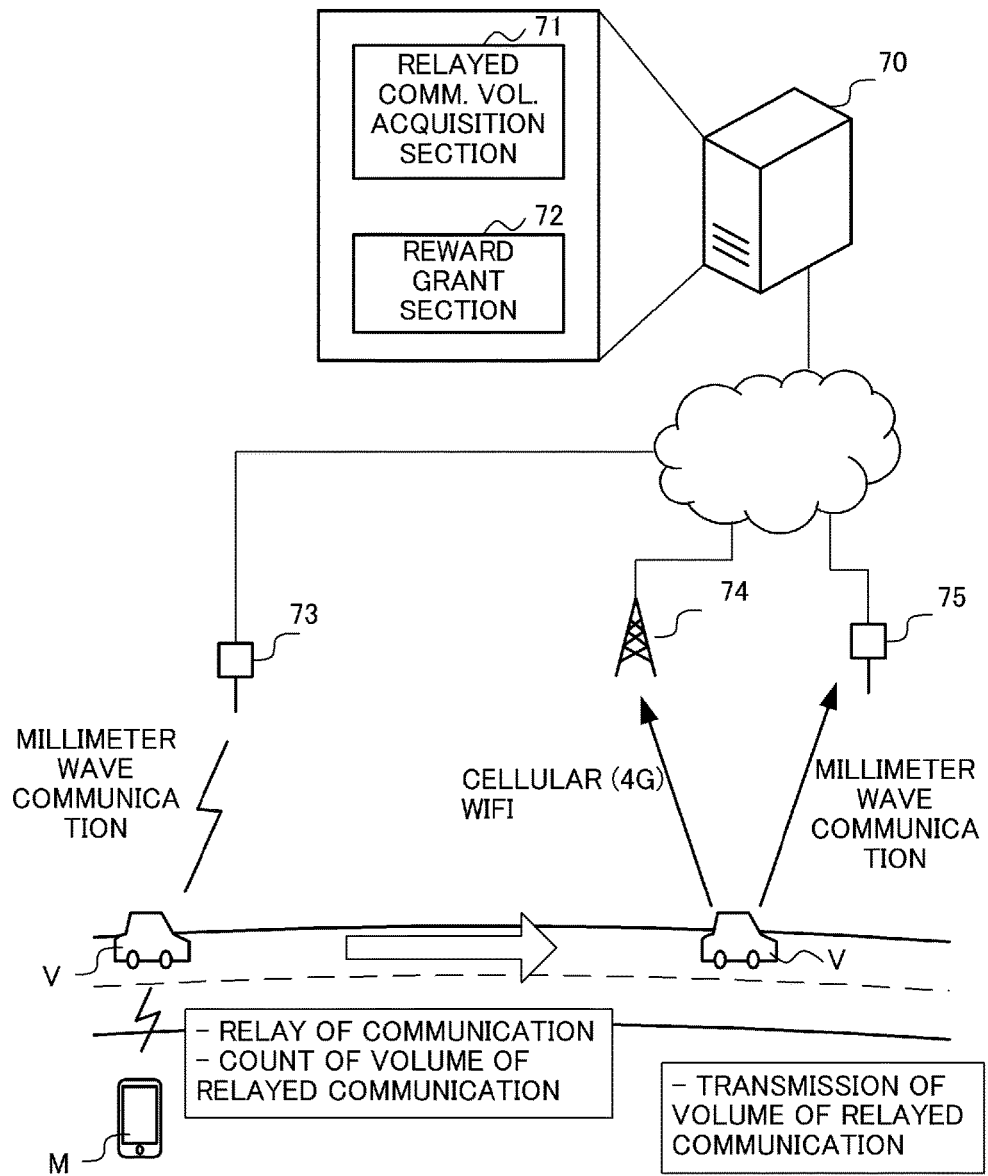
FIG. 7 is a view for explaining a configuration and a process related to reward grant according to the embodiment.

FIG. 7 is a view for explaining a system in which a vehicle V (vehicle-mounted millimeter-wave communication device) transmits the volume of relayed communication to a server device 70, and receives a reward.

The vehicle-mounted millimeter-wave communication device is configured to be capable of communicating with the server device 70 via the millimeter wave communication or another communication (cellular communication or WiFi communication). The server device 70 has a function of granting a reward to a user of a wireless communication device that has relayed communication. The server device 70 has an arithmetic unit such as a microprocessor and a storage device, and functions as a relayed communication volume acquisition section 71 and a reward grant section 72 by execution of a program by the arithmetic unit. The relayed communication volume acquisition section 71 acquires the volume of relayed communication of each communication content type from the vehicle-mounted millimeter-wave communication device. The reward grant section 72 determines the reward to be granted to the user of the vehicle-mounted millimeter-wave communication device based on the information acquired by the relayed communication volume acquisition section 71. The reward may be any reward, and examples of the reward include goods, points corresponding to money, a right to receive a discount or coupon, access to specific information, and upgrade of membership or points for the upgrade. The amount of the reward may be determined based on the simple volume of relayed communication, or may also be determined in consideration of the content type of the relayed communication and road conditions.

As described above, the vehicle V relays communication between a mobile phone terminal M and a mobile phone base station 73 first, and counts the volume of the relayed communication. Subsequently, when the vehicle V becomes capable of communicating with the server device 70 thereafter, the relayed communication volume transmission section 55 notifies the server device 70 of the volume of the relayed communication. At this point, authentication of the vehicle V or the user thereof may be performed. The communication with the server device 70 is not limited to communication by the millimeter wave communication via a roadside device 75, and may be performed by another communication such as cellular communication (4G) or a wireless LAN.

The relayed communication volume acquisition section 71 of the server device 70 acquires information related to the volume of the relayed communication from the vehicle V, and the reward grant section 72 determines the amount of the reward to be granted to the user of the vehicle V, and grants the reward to the user thereof. With regard to the granting of the reward, the reward may be granted as data (processed in a computer), or actual goods may be delivered to the user.

Advantageous Effect of Present Embodiment

According to the present embodiment, in the communication that uses the millimeter wave having high straightness, it becomes possible to perform large-volume communication in a short time by allocating the longer communication time to the direction in which the communication partner is present, and it is possible to keep the communication in the other directions. That is, it is possible to increase the throughput of the communication with the actual communication partner with which the communication is established while allowing the communication with the communication partners (including potential communication partners) present in all directions, and it becomes possible to obtain both of high efficiency and high availability.

To allow the communication in all direction, it is possible to provide the antenna and a radio communication process section in each communication direction, but this arrangement increases the number of the radio communication process sections and cost. In the present embodiment, by handling the communication in each direction based on time-sharing by using one radio communication process section (communication section), it is possible to prevent an increase in cost.

Further, in the present embodiment, the vehicle-mounted millimeter-wave communication device (the user thereof) that has performed the relay of the communication can receive the reward corresponding to the volume of the relayed communication. This incentive increases the number of the vehicle-mounted millimeter-wave communication devices that perform the relay, and the communication relay service becomes available in a wider area accordingly.

Others

In the embodiment described above, the description has been made on the assumption that, in the case where the relay request is not issued, the communication times that are equal to each other are allocated to all directions and the communication is performed. However, in the case where the relay request is not issued, the communication time may be allocated to each direction in accordance with a surrounding environment, or the long communication time may be allocated to the direction in which the communication partner is present. In addition, in the case where the relay request is received as well, the allocation of the communication time of each communication direction may be determined in consideration of the surrounding environment.

Moreover, in the embodiments described above, an example in which the antennas directed in four or eight directions are switchably used, and an example in which the antenna is rotated have been described. However, it is possible to adopt configurations other than the above configurations. In the case where a plurality of the antennas are used, the number of the antennas is not limited to four or eight, and the number thereof may be more than or less than four or eight. In addition, the directivity may be switched by using an adaptive antenna capable of changing the directivity by beamforming. Further, the communication direction may be changed by using both of switching of the antenna to be used and beamforming by using a plurality of the adaptive antennas that are directed in different directions.

In addition, in the above description, the communication time allocation is determined by using the communication time period of 10 milliseconds consisting of four slots each having 2.5 milliseconds as one unit, but the determination of the communication time allocation is not limited to the above mode. The allocation of the communication time may be changed by using a longer unit.

In the above description, while the communication volume of the relayed communication is counted based on the process in the upper layer process section 4, the communication volume thereof may also be counted based on a process in the communication section 3 (MAC layer). However, the process in the MAC layer does not allow recognition of the communication content type, and hence the reward to be granted is determined based on the simple volume of the relayed communication.

In addition, in the above description, while the vehicle-mounted millimeter-wave communication device relays the communication between the mobile phone terminal and the mobile phone base station, the communication devices between which the communication is relayed are not particularly limited. For example, communication between the vehicles (vehicle-mounted millimeter-wave communication devices) may be relayed, and communication between the fixed base station and the vehicle (vehicle-mounted millimeter-wave communication device) may also be relayed.

The present invention can be appropriately modified and implemented without departing from the scope of the technical idea of the invention.

What is claimed is:

1. A vehicle-mounted millimeter-wave communication device mounted on a vehicle and performing communication while temporally changing a communication direction by using an antenna unit capable of changing directivity,
   the device comprising:
   an acquisition unit configured to acquire a relay request that requests relay of communication from a first communication partner;
   a detection unit configured to detect directions of the first communication partner and a second communication partner that are viewed from the vehicle; and
   a communication control unit configured to perform control such that, in a case where the relay request is received from the first communication partner and it is possible to communicate with the second communication partner, communication, in which a communication time longer than a communication time set for another direction is set for each of the directions of the first communication partner and the second communication partner, is performed, and communication between the first communication partner and the second communication partner is relayed.

2. The vehicle-mounted millimeter-wave communication device according to claim 1,
   wherein the first communication partner is a mobile communication device, and
   wherein the second communication partner is a roadside communication device.

3. The vehicle-mounted millimeter-wave communication device according to claim 1, wherein the communication control unit performs control such that, in the case where the relay request is received from the first communication partner and it is possible to communicate with the second communication partner, communication, in which a long communication time is set for each of the directions of the first communication partner and the second communication partner, and communication, in which communication times that are equal to each other are set for all directions, are performed alternately.

4. The vehicle-mounted millimeter-wave communication device according to claim 1, wherein the detection unit detects a direction of a communication partner, based on a communication direction when communication by millimeter wave communication is established.

5. The vehicle-mounted millimeter-wave communication device according to claim 1, wherein the detection unit detects a direction of a communication partner, based on position information of the communication partner received through communication.

6. The vehicle-mounted millimeter-wave communication device according to claim 1, wherein the detection unit detects the directions of the first communication partner and the second communication partner, based on sensor information obtained from a sensor mounted on the vehicle.

7. The vehicle-mounted millimeter-wave communication device according to claim 1,
   wherein the second communication partner is the roadside communication device, and
   wherein the detection unit detects the direction of the roadside communication device, based on pre-stored installation information including an installation position and a communication direction of the roadside communication device.

8. The vehicle-mounted millimeter-wave communication device according to claim 1, further comprising:
   an antenna unit having a plurality of fixed antennas directed in different directions,
   wherein the communication control unit changes, when the plurality of fixed antennas are switchably used, a setting of the communication time of each direction by adjusting a selection time period.

9. The vehicle-mounted millimeter-wave communication device according to claim 1, further comprising:
   an antenna unit having a rotary antenna,
   wherein the communication control unit changes a setting of the communication time of each direction by adjusting a rotation speed of the rotary antenna.

10. The vehicle-mounted millimeter-wave communication device according to claim 1, wherein the second communication partner is the roadside communication device,
    the vehicle-mounted millimeter-wave communication device further comprising:
    a communication volume storage unit configured to store a volume of the relayed communication between the first communication partner and the second communication partner; and
    a transmission unit configured to transmit the volume of the relayed communication to a server device that grants a reward in accordance with the volume of the relayed communication.

11. A millimeter wave communication system comprising:
    the vehicle-mounted millimeter-wave communication device according to claim 10; and
    a server device,
    wherein the server device includes a reward grant unit configured to grant a reward to a user of the vehicle-mounted millimeter-wave communication device in accordance with a volume of relayed communication received from the vehicle-mounted millimeter-wave communication device.

12. A communication control method in a vehicle-mounted millimeter-wave communication device mounted on a vehicle and performing communication while temporally changing a communication direction by using an antenna unit capable of changing directivity,
    the method comprising:
    acquiring a relay request that requests relay of communication from a first communication partner;
    detecting directions of the first communication partner and a second communication partner that are viewed from the vehicle; and
    performing control such that, in a case where the relay request is received from the first communication partner and it is possible to communicate with the second communication partner, communication, in which a communication time longer than a communication time set for another direction is set for each of the directions of the first communication partner and the second communication partner, is performed, and communication between the first communication partner and the second communication partner is relayed.

13. A non-transitory computer-readable medium storing a program for causing a computer to execute the steps of the method according to claim 12.

\* \* \* \* \*